US007133626B2

(12) United States Patent
Kaiga et al.

(10) Patent No.: US 7,133,626 B2

(45) Date of Patent: Nov. 7, 2006

(54) IMAGE FORMING APPARATUS

(75) Inventors: Miho Kaiga, Shizuoka (JP); Takeshi Takagi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 10/902,790

(22) Filed: Aug. 2, 2004

(65) Prior Publication Data

US 2005/0031371 A1 Feb. 10, 2005

(30) Foreign Application Priority Data

Aug. 8, 2003 (JP) ............................. 2003-290005
Dec. 25, 2003 (JP) ............................. 2003-431628

(51) Int. Cl.
*G03G 15/00* (2006.01)
*H02J 1/00* (2006.01)

(52) U.S. Cl. ....................................... 399/110; 399/125

(58) Field of Classification Search ................ 399/107, 399/110, 111, 113, 114, 125
See application file for complete search history.

(56) References Cited

U.S. PATENT DOCUMENTS 4,334,761 A * 6/1982 Saito et al. .................... 399/92
5,153,640 A 10/1992 Okabe ........................ 355/200
5,300,979 A 4/1994 Tsukakoshi et al. ........ 355/200
6,473,576 B1 10/2002 Koshimizu et al. ......... 399/107
6,510,301 B1 * 1/2003 Tanaka ........................ 399/125
6,674,983 B1 1/2004 Enomoto et al. ........... 399/124
6,741,820 B1 * 5/2004 Nobe et al. ................. 399/110
7,024,132 B1 * 4/2006 Nakaoka et al. ............ 399/110
2003/0049061 A1 3/2003 Hata et al. .................. 399/367

FOREIGN PATENT DOCUMENTS

EP 1 289 150 A1 3/2003
JP 6-130742 5/1994
JP 8-6466 1/1996
JP 2001-34141 2/2001
JP 2001-53919 2/2001
JP 2002-247260 8/2002
KR 2002-39258 5/2002

* cited by examiner

*Primary Examiner*—Hoan Tran
(74) *Attorney, Agent, or Firm*—Fitzpatrick, Cella, Harper & Scinto

(57) ABSTRACT

An image forming apparatus includes an image forming portion for forming an image, an image reading portion for reading an image, displaceable with respect to the image forming portion, and an open/closable member that can be opened or closed with respect to a main body of the image forming portion and displaced toward the image reading portion, wherein the displacement of the open/closable member is effected in relation to the displacement of the image reading portion. In this manner the open/closable member can be opened or closed by a simple operation, without increasing the dimension of the image forming apparatus.

15 Claims, 14 Drawing Sheets

IMAGE FORMING APPARATUS

This application claims priorities from Japanese Patent Applications No. 2003-290005 filed on Aug. 8, 2003, and No. 2003-431628 filed on Dec. 25, 2003, which are hereby incorporated by reference herein.

BACKGROUND OF THE INVENTION

1. Field of the Invention

The present invention relates to an image forming apparatus and more particularly to an image forming apparatus of integrated type with an image forming portion and an image reading portion.

2. Related Background Art

An image forming apparatus utilizing for example an electrophotographic method is conventionally provided with an image forming portion for charging an electrophotographic photosensitive member (photosensitive member) serving as an image bearing member, executing an exposure according to image information to form an electrostatic image on the photosensitive member, developing the electrostatic image with a developer (toner) to obtain a developer image (toner image), then transferring the toner image onto a recording material and fixing it thereby forming a recorded image. Also there is widely popular an image forming apparatus (integrated apparatus) which is not only provided with such image forming portion functioning as a printer for forming an image in response to an image information signal transmitted from an external equipment but also which is provided with an image reading portion for optically reading image information of an original to provide an electrical signal thereby functioning as a copying machine for forming an image in the image forming portion according to image information read in the image reading portion or as a scanning apparatus for transmitting the information read in the image reading portion to an external equipment such as a host computer connected communicably with the image forming apparatus.

Also in the image forming apparatus utilizing the electrophotographic method, there is employed a process cartridge system in which a photosensitive member and process means acting on such photosensitive member are integrally constructed in a cartridge and such cartridge is detachably mounted on a main body of the apparatus. Such process cartridge system allows the maintenance of the apparatus to be executed not by a service personnel but by the user himself, thereby drastically improving the operability of the apparatus. For this reason, such process cartridge system is widely employed in the image forming apparatus. It is also known to construct a developing apparatus for developing the electrostatic image forming on the photosensitive member as an independent unit (developing cartridge) detachably mountable on the main body of the apparatus.

In a small-sized or medium-sized integrated apparatus provided for example with an image reading portion above an image forming portion and with a recording material discharging portion between the image forming portion and the image reading portion, there is required a configuration allowing to open the interior of the image forming portion for handling trouble in the image forming portion or performing maintenance work such as cleaning of the interior or a replacement of consumable part (replacement part) such as the cartridge.

There is generally employed a system in which the image reading portion is made to slide in a translational movement (lateral direction) with respect to the image forming portion provided thereunder, thereby opening the interior of the image forming portion.

However, in case the image reading portion slides in a translational movement with respect to the image forming portion, it is necessary to provide rail members, bearings etc. for slidably supporting the heavy image reading portion, thereby resulting in an increase in the number of components. Also the parallel sliding of the image reading portion relative to the image forming portion increases the area occupied by the main body of the apparatus, thereby requiring a large footprint for installation.

For this reason, there is employed a system of securing a space between the image forming portion and the fixed image reading portion positioned above the image forming portion, and opening an upper cover member provided on the image forming portion thereby opening the interior of the image forming portion.

However, in order to enable access to the interior of the image forming portion by securing a space between the image forming portion and the fixed image reading portion positioned above the image forming portion, and opening the upper cover member provided on the image forming portion, it is necessary to form a sufficiently large aperture between the image forming portion and the image reading portion, whereby the height of the apparatus has to be increased, thereby resulting in drawbacks of an increased height of the copy board of the image reading portion, a deterioration in the operability and an increase in the dimension of the main body of the apparatus.

SUMMARY OF THE INVENTION

An object of the present invention is to provide an image forming apparatus allowing to open-closing operation of an open/closable member by a simple operation without an increase in the dimension of the apparatus.

Another object of the present invention is to provide an image forming apparatus including an image forming portion for forming an image, an image reading portion for reading an image and displaceable with respect to the image forming portion, and an open/closable member which can be opened or closed to a main body of the image forming portion and is movable to a side of the image reading portion, wherein the movement of the open/closable member is activated in relation to the displacement of the image reading portion.

Still other objects of the present invention will become fully apparent from the following description.

DETAILED DESCRIPTION OF THE PREFERRED EMBODIMENTS

Figure 1:
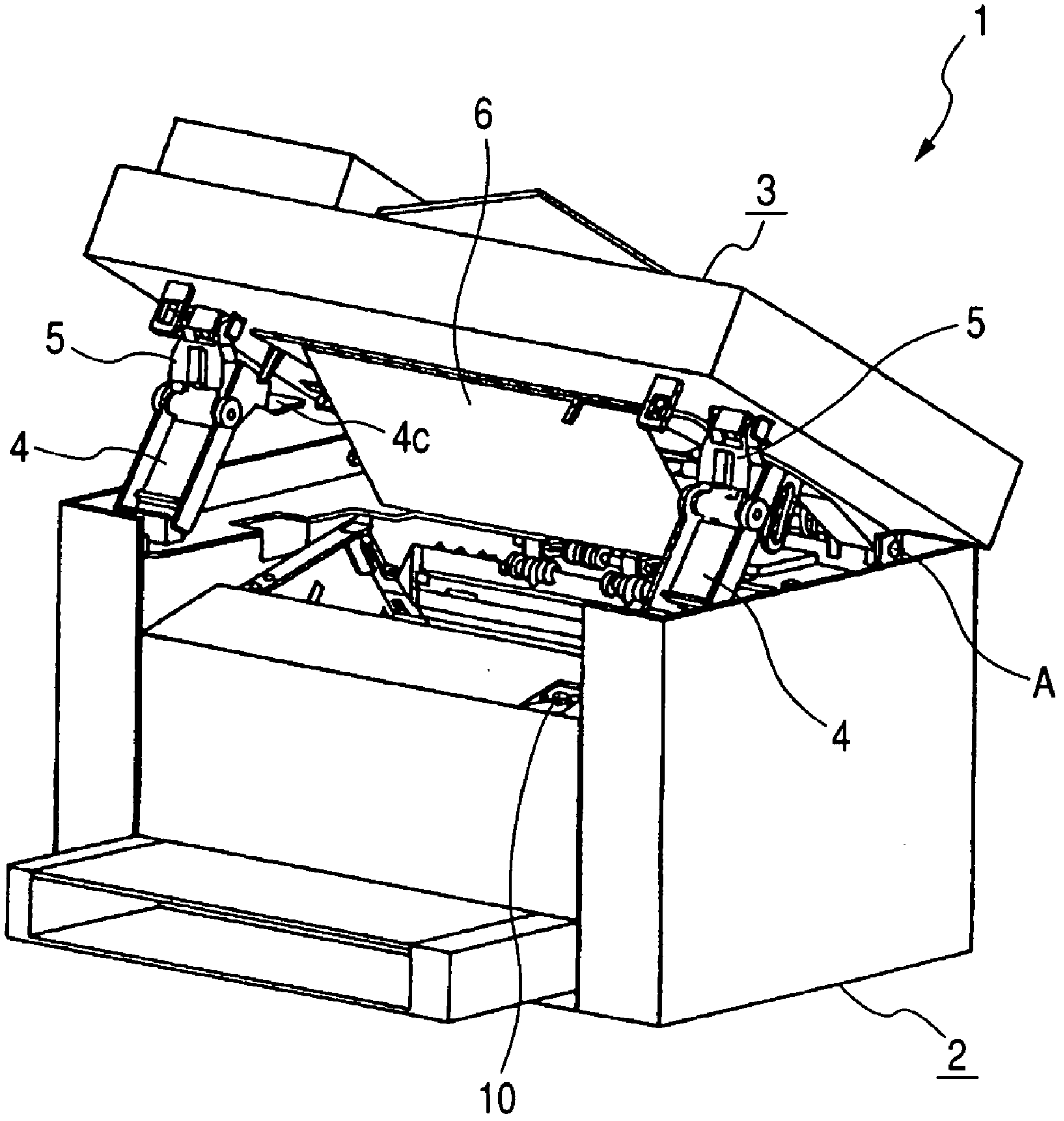
FIG. 1 is a perspective view showing a state in which a scanner and a door are opened, in an image forming apparatus constituting a first embodiment of the present invention.

In the following, embodiments of the present invention will be explained with reference to accompanying drawings. In the drawings of following embodiments, same or equivalent portions are presented by a same number.

Figure 2:
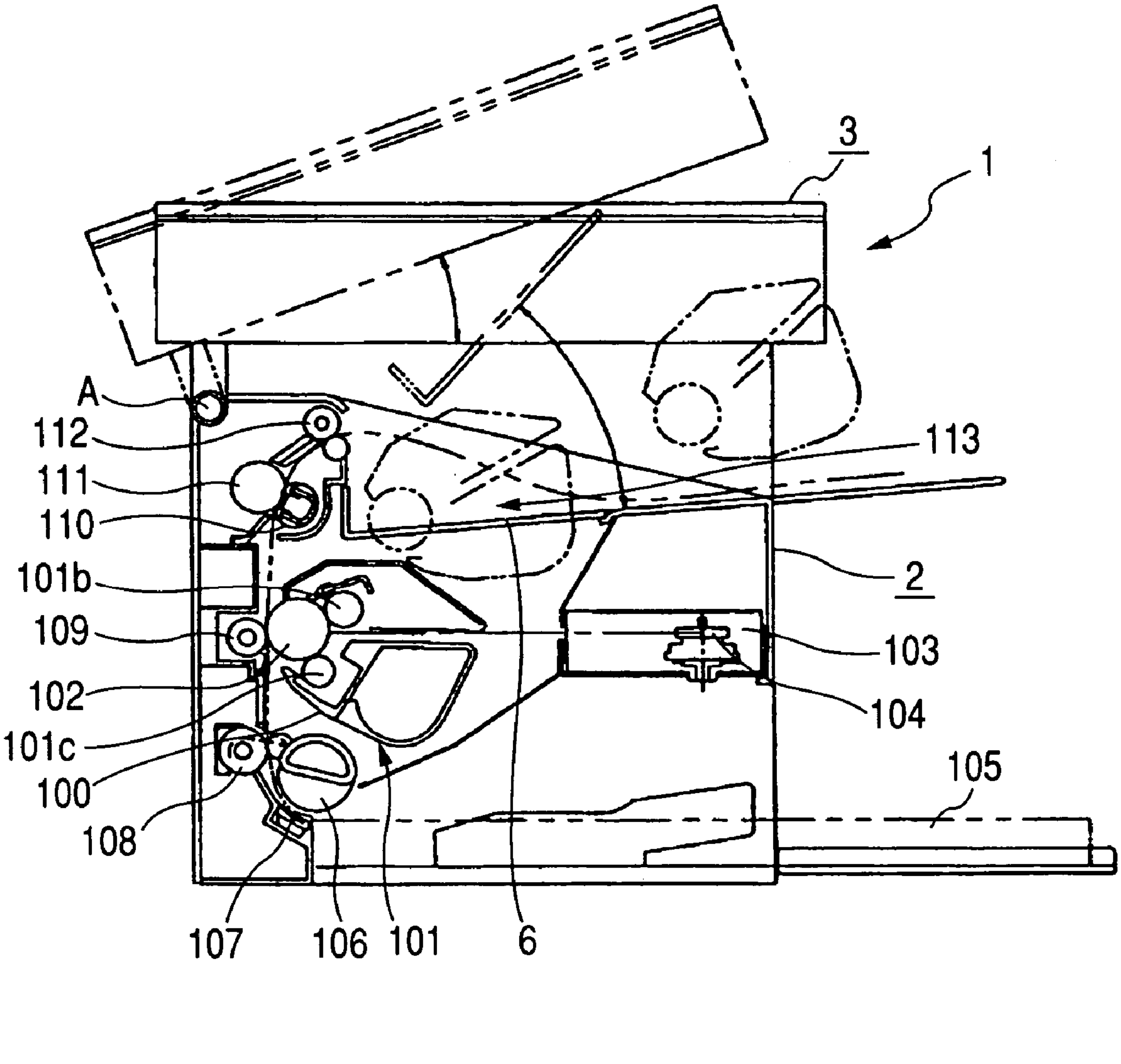
FIG. 2 is a cross-sectional view showing an internal structure of the image forming apparatus.

At first there will be explained an image forming apparatus constituting a first embodiment of the present invention. FIG. 1 shows a state, in an image forming apparatus having an image reading portion above an image forming portion (hereinafter called integrated apparatus) of the first embodiment, where a scanner 3 and a door (cartridge door) 6 constituting an open/closable member, and FIG. 2 is a schematic view showing the internal configuration of the printer.

As shown in FIG. 1, the integrated apparatus 1 is largely constituted of a printer 2 constituting an image forming portion, and a scanner 3 constituting an image reading portion. The scanner 3 is provided above the printer 2 in a state sandwiching a discharged sheet stacking portion 113 (cf. FIG. 2) constituting a recording material discharge portion.

Also the scanner 3 is movable with respect to the printer 2. More specifically, the scanner 3 is provided rotatably with respect to the printer 2, about a rotary center A in a rear portion. Also in a front portion, the printer 2 and the scanner 3 are linked by a pair of link members, provided at left and right, each constituted of a lower link 4 and an upper link 5.

In the following, internal structure of the printer 2 will be explained. As shown in FIG. 2, the printer 2 is a laser printer in which a process cartridge 101 provided with image forming means to form an image by an electrophotographic process and to record such image on a recording sheet (recording material).

The process cartridge 101 is provided, in a casing, with a rotatable photosensitive drum 102 serving as an image bearing member, charging means 101*b* and developing means 101*c*.

Also in a front portion (right side in FIG. 2) of the main body of the apparatus, there is provided a laser scanner unit 103 constituting light emitting means for irradiating the photosensitive drum 102 with an optical image utilizing a polygon mirror 104, according to image information from a host computer.

A recording sheet contained in a sheet cassette 105 is separated one by one and fed by a sheet feeding roller 106 and sheet separating means 107, based on a print signal from a host computer (not shown). The separated recording sheet is conveyed by paired conveying rollers 108 to a transfer portion constituted of the photosensitive drum 102 and a transfer roller 109 pressed to the photosensitive drum 102.

In this manner, the photosensitive drum 102 charged by charging means 101*b* is exposed to an optical image corresponding to the image information to form a latent image, which is rendered visible by development with toner in the developing means 101*c*, and a toner image is transferred onto the recording sheet in a pressed portion between the photosensitive drum 102 and the transfer roller 109.

The recording sheet bearing the transferred toner image is conveyed to a fixing portion (fixing means) constituted of a fixing film 110 and a pressure roller 111 pressed to the fixing film 110, wherein the toner image is fixed. The recording sheet on which the toner image is fixed is conveyed by paired discharge rollers 112 and is discharged to a discharged sheet stacking portion 113 provided above the printer 2.

The discharged sheet stacking portion 113 is provided on an upper surface of a cartridge door 6 constituting a part of the casing (external cover) of the printer 2. The cartridge door 6 is provided on a frame 7 of the printer 2, rotatably about a rotary center A. By opening the cartridge door 6 from the main body of the printer 2, the interior of the printer 2 can be opened thereby enabling access to the cartridge 101 and jam processing of the recording sheet.

The scanner 3 is a scanner (reader for reading an original) of flat bed type, and is provided therein with scanning means which scans and reads an original.

Figure 3:
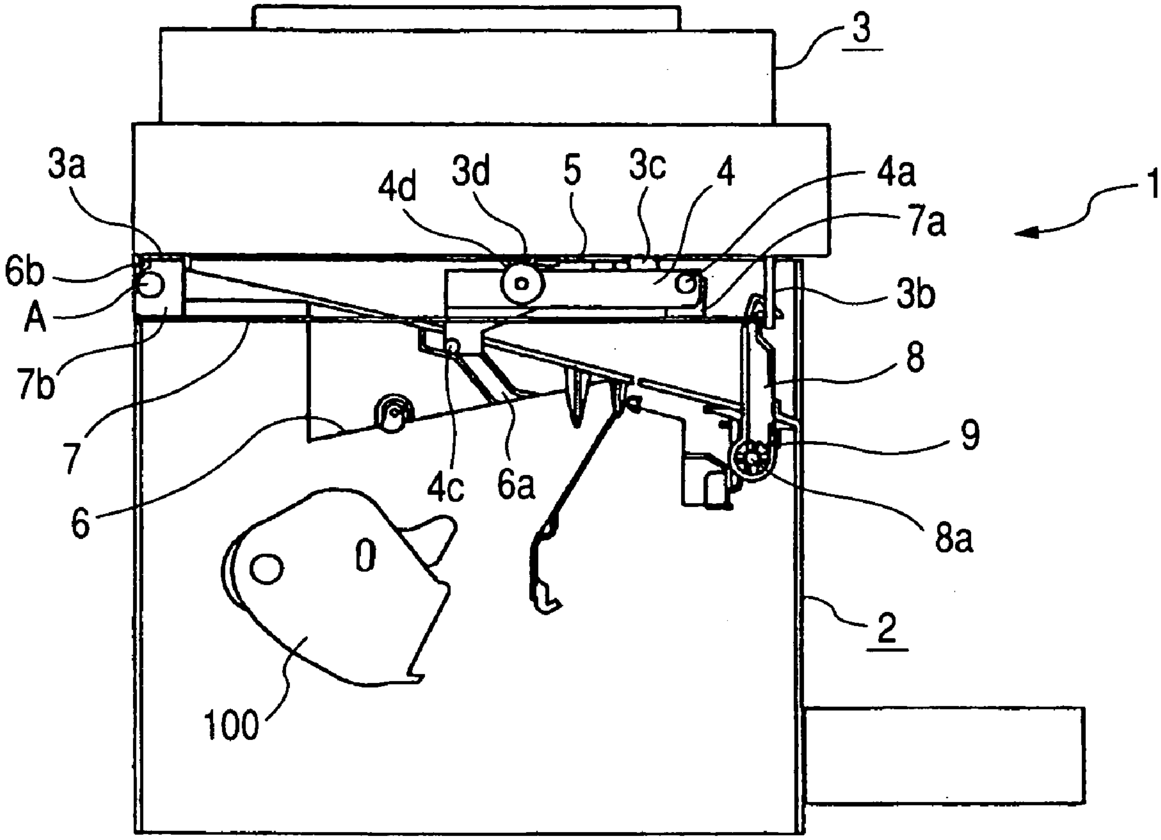
FIG. 3 is a cross-sectional view showing an open-closing link mechanism in a state where the scanner is closed.
Figure 4:
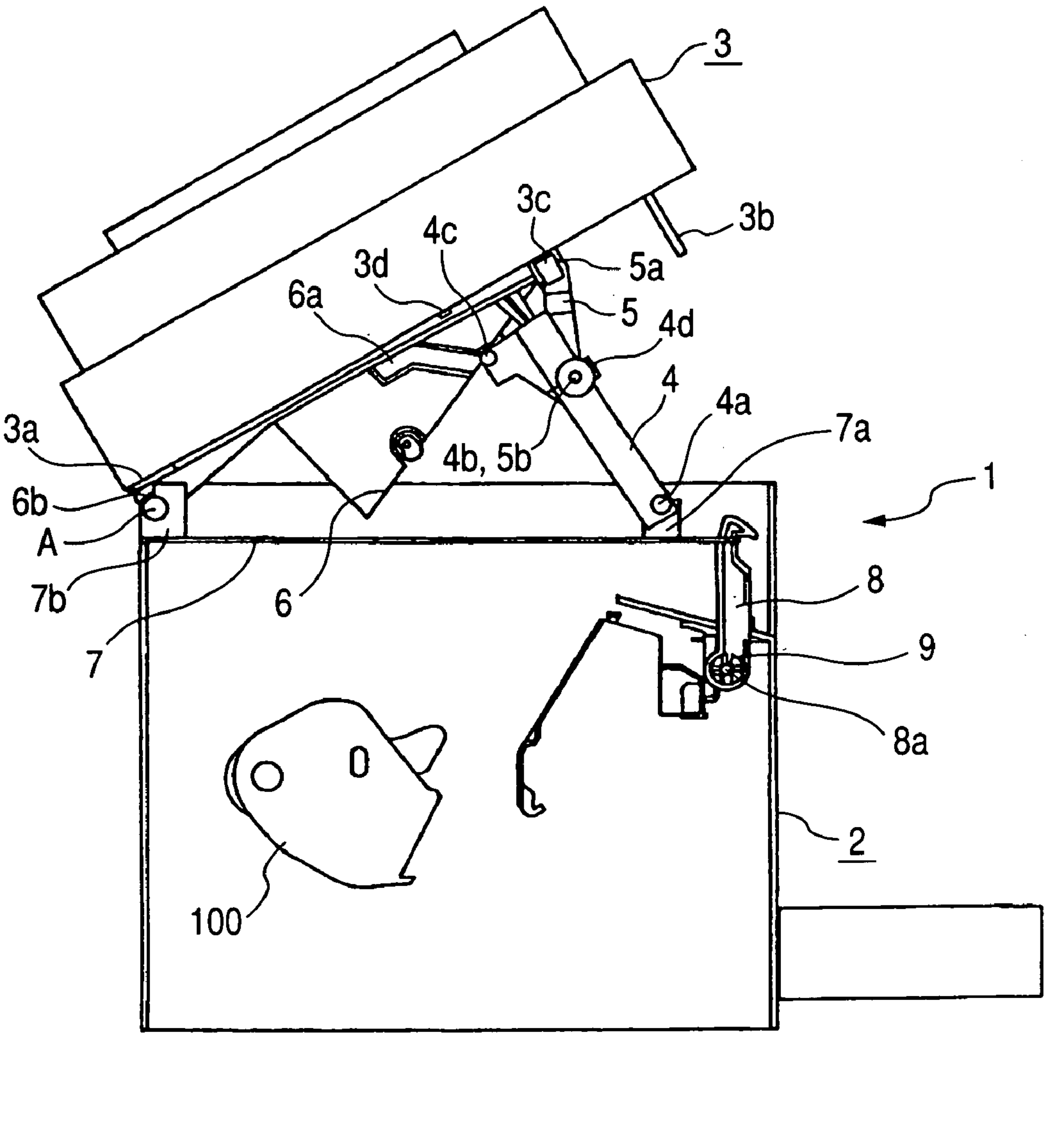
FIG. 4 is a cross-sectional view showing the open-closing link mechanism in a state where the scanner is opened.

In the following, there will be explained an open/closable mechanism of the scanner 3 and the cartridge door 6. FIG. 3 shows an open/closable link mechanism in a state where the scanner 3 is closed, and FIG. 4 shows an open/closable link mechanism in a state where the scanner 3 is opened.

The cartridge door 6 as the open/closable member (an openable and closable member) is moveable with respect to said image forming portion and toward the image reading portion. The cartridge door 6 is provided to be opened and closed with respect to a main body of the image forming apparatus.

As shown in FIG. 3, a scanner rotation supporting portion 3*a* is provided in a rear position under the scanner 3.

The scanner 3 is mounted rotatably about the rotary center A with respect to the printer 2, by a scanner rotation supporting portion 7*b* which constitutes a part of a frame 7 of the main body of the printer 2. Also an end portion, at a side opposite to the rotary center, is fixed by an engagement of a recess of a hook 3*b* provided in the front end portion of the scanner 3 with a claw of a latch 8 provided inside the printer 2.

The latch 8 is constantly biased by a latch spring 9 about a rotation center 8*a* of the latch, in a direction to engage with the hook 3*b*.

The latch 8 and a latch releasing button 10 shown in FIG. 1 are so supported as to be linked on a same axis. When the latch releasing button 10 is depressed, the latch 8 is released from the hook 3*b* of the scanner 3 whereby the front portion thereof is lifted upwards. Thus the scanner 3 is rendered rotatable about the rotary center A.

Also the printer 2 and the scanner 3 are linked by a pair of link members, each constituted of a lower link 4 and an upper link 5. Among these, the lower link 4 is provided with a lower link rotation supporting portion 4*a* which is rotatably supported by a lower rotation supporting portion 7*a* of the frame 7 of the printer 2. On the other hand, the upper link 5 is provided with an upper link rotation supporting portion 5*a* which is rotatably supported by an upper rotation supporting portion 3*c* provided in a lower portion of the scanner 3.

These upper link 5 and lower link 4 are rotatably connected at a lower link connecting portion 4*b* and an upper link connecting portion 5*b*, respectively opposite to the supporting portions. Through such connections, the lower surface of the scanner 3, the frame 7 of the printer 2, the lower link 4 and the upper link 5 are rotatably supported at the rotation supporting portions to constitute 4-articulation links.

The lower link 4 is provided, at a front end opposite to the rotation supporting portion, with a link projection 4*c* protruding toward the cartridge door 6*a*. Also the cartridge door 6 is provided, on a lateral face thereof, with a guide groove 6*a* in which the link projection 4*c* is loosely fitted and slides.

Along the rotary motion of the lower link 4, the link projection 4*c* reciprocates in the guide groove 6. The link projection 4*c* pushes up an upper face of the guide groove 6*a* to rotate the cartridge door 6 in an opening direction, and pushes down a lower face to rotate the cartridge door 6 in a closing direction.

The lower link 4 is provided, on an upper face thereof, with a projection 4*d*. Also the scanner 3 is provided, on a lower fade thereof, with a projection 3*d* in a position to press the projection 4*d* downwards in the closed state of the scanner 3.

Such downward depressing of the projection 4*d* by the projection 3*d* and simultaneous downward depressing of the lower surface of the guide groove 6*a* by the link projection 4*c* cause the lower face of the guide groove 6*a* to be depressed downwards. Therefore, the cartridge door 6 can be securely closed to a predetermined position by the completion of the closing operation of the scanner 3.

In the following an open-closing operation of the scanner 3 and the cartridge door 6 will be explained. A rotating direction will be represented as clockwise or counterclockwise, looking at the plane of FIGS. 3 and 4.

In a stationary state as shown in FIG. 3, the scanner 3 is fixed to the printer 2 by engagement of the hook 3*b*, at an end opposite to the rotary center of the scanner rotation supporting portion 3*a*, with the latch 8.

In case of opening the interior of the printer 2 for replacing the cartridge 101 or for jam processing, the latch releasing button 10 is depressed. Thus the latch 8 linked with the latch releasing button 10 is rotated counterclockwise and the hook 3*b* is released from the latch 8. Thus the scanner 3 is freed at a side opposite to the rotation supporting portion, thereby being rendered rotatable about the rotary center A.

Then, by lifting the scanner 3 at a side thereof opposite to the rotation supporting portion, the scanner 3 rotates counterclockwise about the rotary center A.

In this operation, the scanner 3, the frame 7 of the printer 2, the lower link 4 and the upper link 5 constitute a 4-articulation link. Therefore, with the rotation of the scanner 3, the lower link 4 rotates clockwise on a predetermined trajectory about the lower link rotation supporting portion 4*a*, and the upper link 5 rotates counterclockwise on a predetermined trajectory about the upper link connecting portion 5*b*.

At the same time, the link projection 4*c* provided on the lower link 4 rotates on a predetermined trajectory along with the rotation of the lower link 4. Thus the upper face of the fitted guide groove 6*a* is pressed upwards.

By the upward pressed motion of the guide groove 6*a*, the cartridge door 6 is pressed upwards and rotates counterclockwise about the cartridge door rotation supporting portion 6*b*. As a result, the opening of the scanner 3 simultaneously causes opening of the cartridge door 6, thereby enabling access to the interior of the printer 2.

Also for closing the scanner 3, an end opposite to the rotation supporting portion thereof is pressed downwards whereby the scanner rotates clockwise. In this operation, since the lower face of the scanner 3, the frame 7 of the printer 2, the lower link 4 and the upper link 5 constitute a 4-articulation link, with the rotation of the scanner 3, the lower link 4 rotates counter clockwise on a predetermined trajectory about the lower link rotation supporting portion 4*a*, and the upper link 5 rotates clockwise on a predetermined trajectory about the upper link connecting portion 5*b*.

Also the link projection 4*c* provided on the lower link 4 rotates on a predetermined trajectory along with the rotation of the lower link 4, thus pressing down the lower face of the fitted guide groove 6*a*. The downward motion of the guide groove 6*a* presses downwards the cartridge door 6 which rotates clockwise about the cartridge door rotation supporting portion 6*b*.

On the other hand, the latch 8 is constantly urged clockwise by the latch spring 9. It is momentarily rotated counterclockwise against the urging force of the latch spring 9, by the entry of the hook 3*b* from above immediately before complete closing of the scanner 3, and is thereafter rotated clockwise again by the latch spring 9. Thus the hook 3*b* engages with the latch 8 to fix the end of the scanner 3 opposite to the rotary center.

Figure 5:
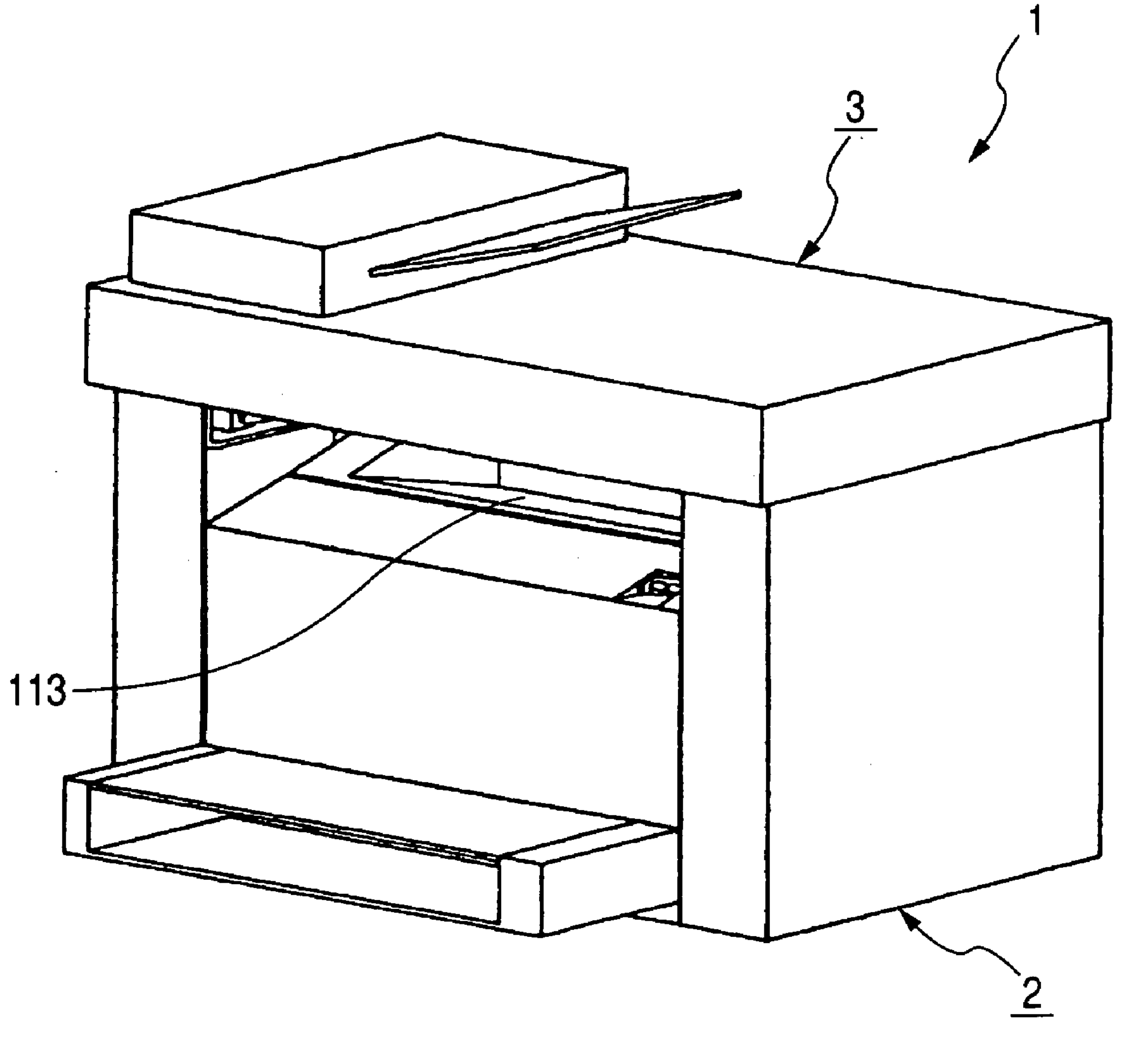
FIG. 5 is a perspective view of the image forming apparatus in a stationary state.

When the scanner 3 is completely closed as shown in FIG. 5, the projection 4*d* of the lower link is depressed downwards by the projection 3*d* of the scanner 3 and the lower face of the guide groove 6*a* is pressed downwards by the link projection 4*c*. As a result, the cartridge door 6 can be securely closed in a predetermined position.

Thus, in the present embodiment, the cartridge door 6 displaces in linkage with the displacement of the scanner 3.

In this manner, the present embodiment allows to effect moving (open-close) the cartridge door 6 in a single action of displacing the scanner 3 without increasing the distance between the scanner 3 and the printer 2, thereby enabling to reduce the dimension of the apparatus and to improve operation characteristics for the user.

For the scanner 3, the opening angle is preferably made as small as possible in consideration of a height occupied by the apparatus and a stability thereof. On the other hand, for the cartridge door 6, the opening angle is preferably made larger in consideration of easy access to the interior of the printer 2.

Therefore, a configuration of the first embodiment in which the cartridge door 6 is opened through the link members constituted of the lower link 4 and the upper link 5 allows to obtain a larger opening angle in the cartridge door 6 than in the opening angle of the scanner 3, in comparison with a configuration in which the cartridge door 6 is simply pulled up by the scanner 3. Thus, access to the cartridge is facilitated without impairing the stability.

In the first embodiment, the scanner rotation supporting portion 3*a* and the cartridge door rotation supporting portion 6*b* have a same rotary center A, but they need not necessarily to coincide in position. It is thus possible to regulate the opening angle of the cartridge door 6 relative to that of the scanner 3, by adjusting the rotary center positions of the scanner rotation supporting portion 3*a* and the cartridge door rotation supporting portion 6*b* and an angle of the guide groove 6*a* of the carriage door 6.

Figure 6:
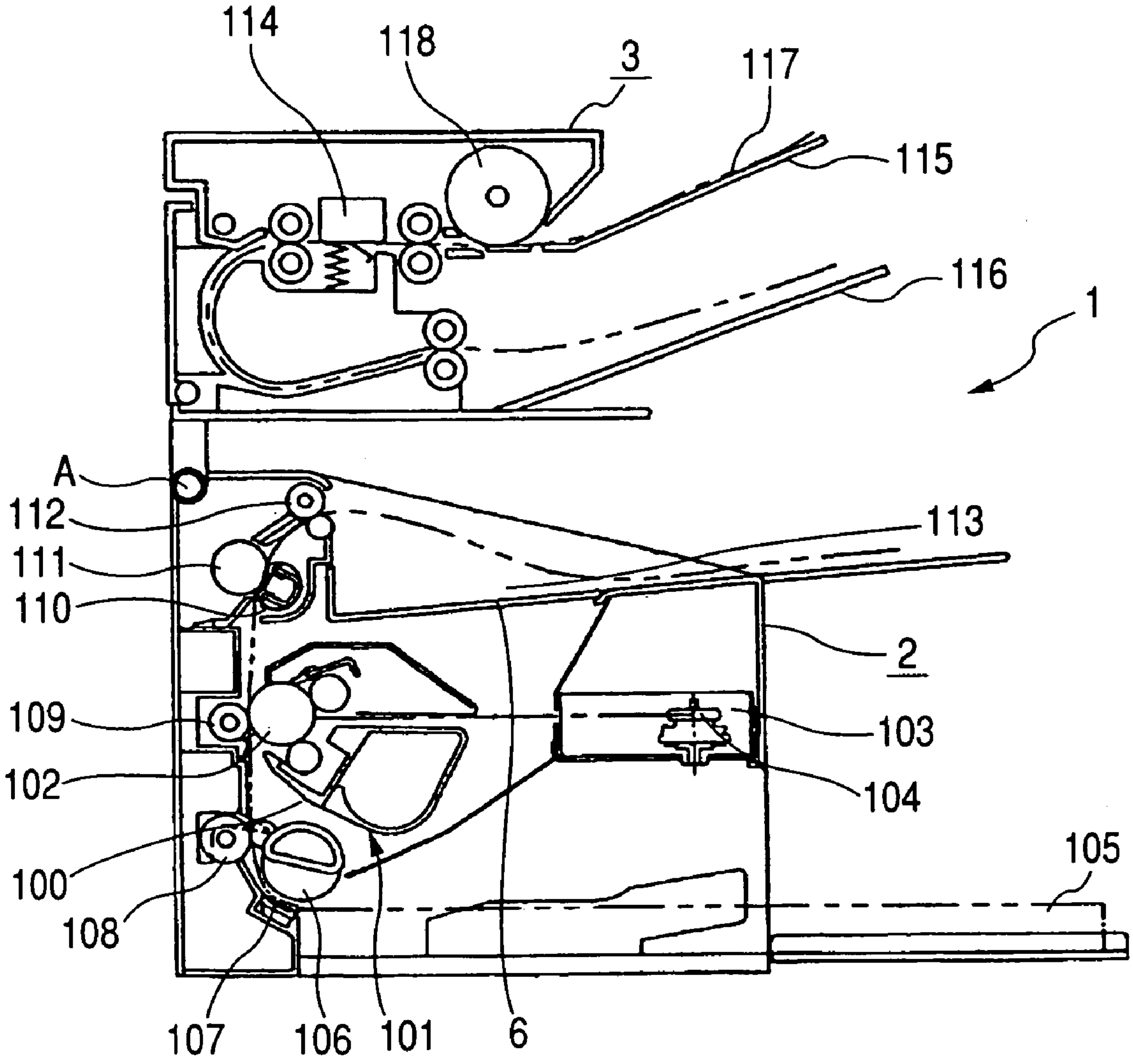
FIG. 6 is a cross-sectional view showing an image forming apparatus constituting a second embodiment of the present invention.

In the following there will be explained an image forming apparatus constituting a second embodiment of the present invention. FIG. 6 shows an internal structure of a printer and a scanner, in a integrated apparatus as the image forming apparatus of the second embodiment.

Referring to FIG. 6, the scanner 3 is provided with a contact image sensor (CIS) 114 constituting an original reading portion, and an original stacking tray 115 and an original discharge tray 116 provided respectively at upstream and downstream sides of the CIS 114.

Originals (sheet materials) 117 are set on the original stacking tray 115 for example with image-bearing surfaces upwards, and are conveyed one by one from an uppermost one by a pickup roller 118 to an original reading portion.

The conveyed original 117 is subjected, by the contact image sensor 114, to a photoelectric reading of the image on the original, and the original 117 after image reading is discharged onto the original discharge tray 116 in the original reading portion, for example with the image-bearing surface downwards.

Also between the scanner 3 and the printer 2, a lower link and an upper link are provided in a 4-articulation structure as in the first embodiment. The open-closing operation of the scanner 3 and the linked movement of the cartridge door 6 are similar to those in the first embodiment, and will not, therefore, be explained further.

The present embodiment can provide similar effects as those in the foregoing embodiment.

According to the embodiments explained in the foregoing, the image forming apparatus is provided with the image reading means above the image forming means across the discharged sheet stacking portion, and the image reading means and a part of the cover of the image forming means are constructed rotatably to enable open-closing of the cover in a single action while minimizing the height of the image forming apparatus and to achieve the open-closing operation of the cover of the image forming means in linkage with the open-closing operation of the image reading means, thereby significantly improving the operability.

Also in the aforementioned embodiments, the discharged sheet stacking means is provided between the image forming means and the image reading means provided thereabove to achieve effective utilization of the space and to enable satisfactory observation of the interior of the image forming portion, thereby securing a sufficient open space for facilitating the replacement of the consumable parts.

In the following, there will be explained an embodiment in which apparatuses in the image forming portion are securely made inactive when a door is opened.

An image forming apparatus 1 of a third embodiment of the present invention is a integrated apparatus provided with an image forming portion (hereinafter called printer portion) 2 and an image reading portion (hereinafter scanner portion) 3, and is capable of functioning not only as a printer or a copying apparatus for forming an image by the printer portion 2 according to image information from an external equipment such as a host computer connected communicably with the image forming apparatus 1 or according to image information of an original read by the scanner portion 3, but also as a scanner apparatus for transmitting image information of an original read by the scanner portion 3 to an external equipment connected communicably with the image forming apparatus 1.

Figure 7:
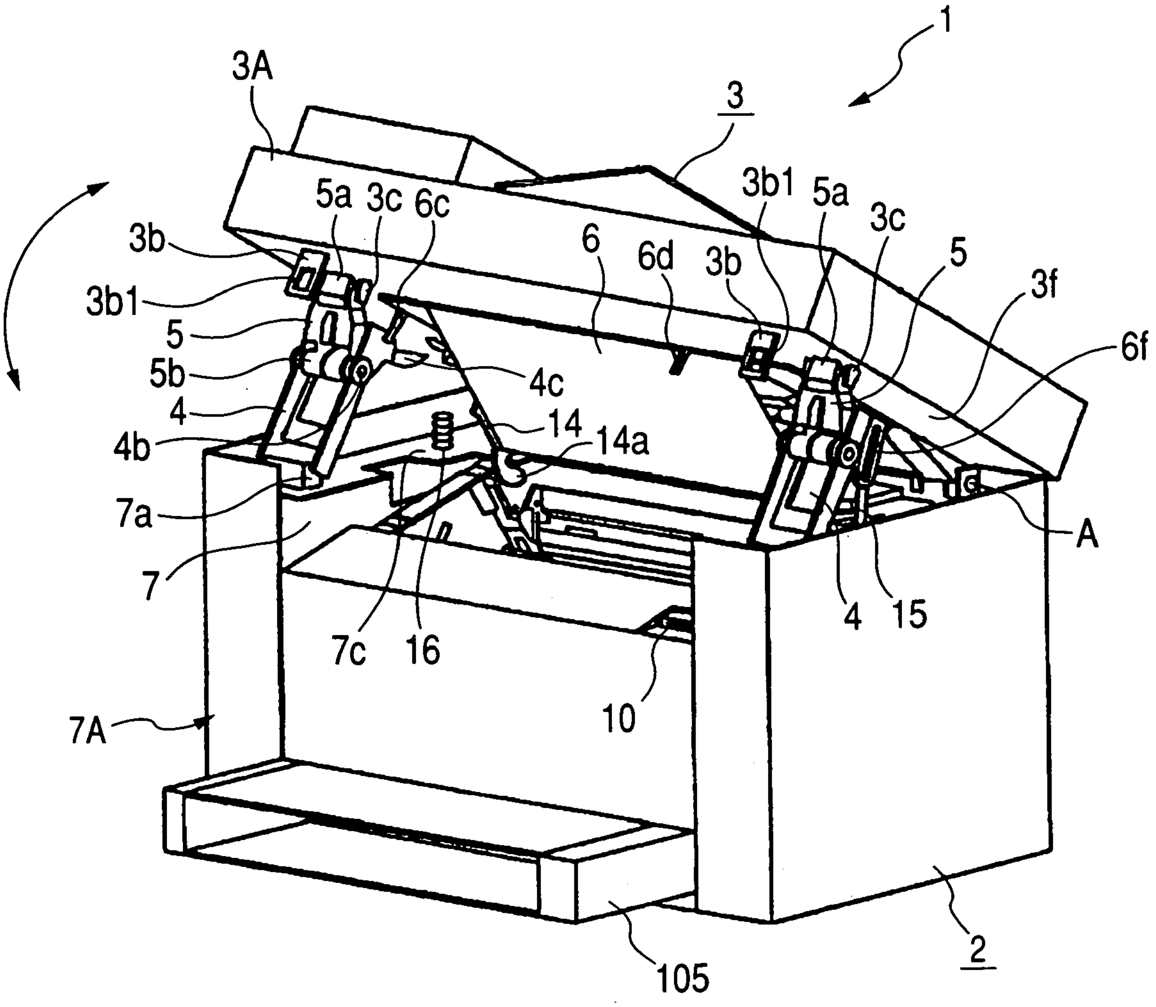
FIG. 7 is a perspective view showing an image forming apparatus constituting a third embodiment of the present invention.
Figure 13:
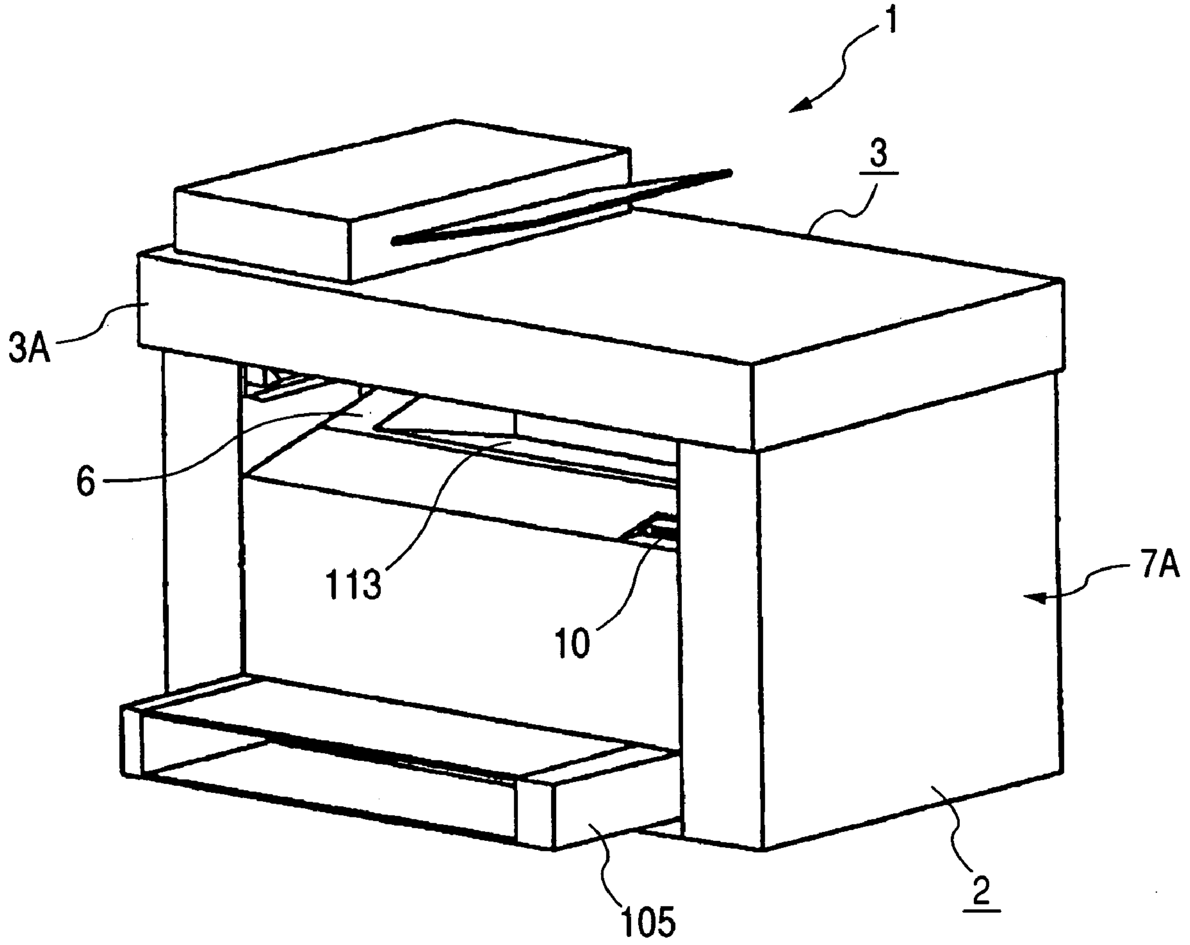
FIG. 13 is a perspective view of an image forming apparatus in a stationary state.

In the following description, “front side” with respect to the image forming apparatus 1 means a front side in the views shown in FIGS. 7 and 13 or a right-hand side in FIGS. 8 to 11, while “rear side” means a rear side in the views shown in FIGS. 7 and 13 or a left-hand side in FIGS. 8 to 11, and “left” or “right” with respect to the image forming apparatus 1 means a left- or right-hand wide when the image forming apparatus 1 is seen from the “front side”.

(Entire Configuration of Image Forming Apparatus)

At first the configuration of the image forming apparatus 1 will be explained briefly, with reference to FIGS. 7, 8 and 13.

The image forming apparatus 1 is principally constituted of a printer portion 2 and a scanner portion 3, and the scanner portion 3 is provided above the printer portion 2 with a recording material discharging portion (to be explained later) positioned therebetween. As will be explained in more detail in the following, the scanner portion 3 is mounted rotatably with respect to the printer portion 2, about a rotary (rotation) center A along a lateral direction (substantially perpendicular to a conveying direction of a recording material P) of the image forming apparatus 1 at a rear end thereof. The printer portion 2 and the scanner portion 3 are connected by a pair of link members, each constituted of a lower link 4 and an upper link 5, respectively provided in the vicinity of left and right front ends of the image forming apparatus 1. Thus, as will be explained later in more detail, by lifting a front end portion 3A of the scanner portion 3 with respect to the printer portion 2, a door 6 covering the substantially entire upper surface of the printer portion 2 is opened together with the scanner portion 3, thereby exposing the interior of the printer portion 2. The rotary center of the scanner portion 3 is not limited to the position in the present embodiment, but can be in an arbitrary position as long as the interior of the printer portion 2 can be sufficiently exposed.

Figure 8:
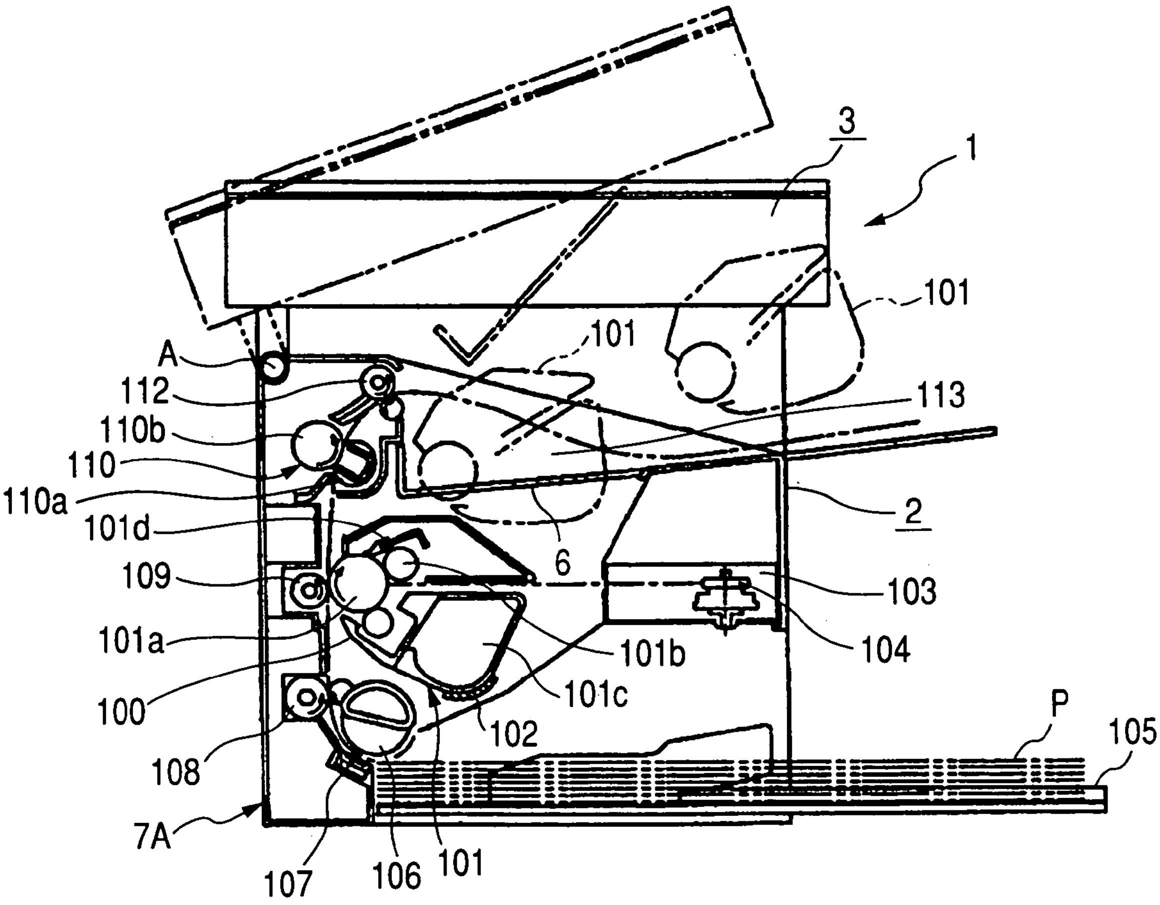
FIG. 8 is a cross-sectional view showing the internal structure of the image forming apparatus.

FIG. 8 shows the internal structure of the printer portion 2, which is a laser beam printer for recording an image on a recording material P for example a recording paper, a plastic sheet (overhead projector (OHP) sheet) or a cloth by an electrophotographic process. The electrophotographic process will not be explained in detail as it is well known to those skilled in the art, but forms an image briefly in following configurations and functions. In FIG. 8, the link members are omitted for facilitating the understanding of the internal structure.

In the printer portion 2, a cylindrical electrophotographic photosensitive member (hereinafter called photosensitive drum) 101*a* serving as an image bearing member is rotatably supported, and, at the image formation, the surface of the rotating photosensitive drum 101*a* is uniformly charged by a charging roller 101*b* serving as charging means. The charged photosensitive drum 101*a* is irradiated with an optical image corresponding to image information from exposure means (image writing means) 103 to form an electrostatic latent image on the photosensitive drum 101*a*. In a front part of the printer portion 2, there is provided a laser scanner unit 103 constituting exposure means for irradiating the photosensitive drum 101 with the optical image. The laser scanner unit 103 irradiates the photosensitive drum 101*a* with a laser beam (scan exposure) through a polygon mirror 104 according to the image information for example from a host computer, thereby forming an electrostatic latent image corresponding to the image information on the photosensitive drum 101*a*. Naturally the electrostatic latent image can be formed corresponding to image information read by the scanner portion 3.

The electrostatic latent image formed on the photosensitive drum 101_a_ is then developed as a developer image (toner image) by the supply of developer (toner) in a developing device 101_c_ serving as development means.

Recording materials P contained in a cassette 110 constituting recording material storage portion are separated and conveyed one by one by a feeding roller 106 serving as a recording material feeding member and a separating pad 107 serving as recording material separating means, in response to a print signal for example from a host computer. The separated recording material P is conveyed by paired conveying rollers 108 constituting recording material conveying members to a transfer portion constituted by the photosensitive drum 101_a_ and a transfer roller 109 pressed thereto and constituting transfer means.

Thus the toner image is transferred onto the recording material P at the pressed portion (transfer portion) of the photosensitive drum 101_a_ and the transfer roller 109. The recording material P bearing the transferred toner image is conveyed to a fixing portion (fixing means) 110 constituted of a fixing film 110_a_ and a pressure roller 110_b_ pressed thereto, thus subjected to fixation of the toner image. The recording material P bearing the fixed toner image is conveyed by paired discharge rollers 112 and is discharged to a recording material discharge portion 13 above the printer portion 2.

Toner remaining on the photosensitive drum 101_a_ after the transfer of the toner image by the transfer roller 109 from the photosensitive drum 101_a_ to the recording material P, is eliminated by cleaning means 101_d_ including a cleaning blade as a cleaning member in contact with the photosensitive drum 101_a_.

In the present embodiment, the photosensitive drum 101_a_ and process means acting thereon, including the charging roller 101_b_, the developing device 101_c_ and the cleaning means 101_d_ are integrally constructed by a cartridge frame 100 as a process cartridge 101 detachably mountable in the image forming portion 2, namely in a main body of the image forming apparatus. The process cartridge 101, as will be explained later in more detail, can be mounted by opening the scanner portion 3 and the door 6 and by an inserting operation in a direction from the front side of the image forming apparatus 1 along a direction crossing the longitudinal direction (longitudinal direction of the photosensitive drum 101_a_) as indicated by a chain line in FIG. 8 and for example along an unillustrated guide member provided in the image forming portion 2, and can be detached by inverse operations. The process cartridge 101 is detachably mounted in the image forming portion 2 by cartridge mounting means (positioning means) 102 such as a supporting member or a positioning member provided in the image forming portion 2. The process cartridge is not limited to a configuration of the present embodiment, but may include an electrophotographic photosensitive member and at least one of charging means, developing means and cleaning means as process means acting on the electrophotographic photosensitive member as an integral cartridge detachably mountable in the main body of the image forming apparatus.

A recording material discharge portion 113 is provided on an upper surface of the door 6 constructed as an open/closable member and constituting a part of a casing (external cover) 7A of the printer portion 2. The door 6 is provided in a frame member 7, which is the casing 7A of the printer portion 2 excluding the door 6, open-closably about a rotary center A at the rear end of the image forming apparatus 1 and common with that of the scanner portion 3. Opening of the door 6 relative to the main body of the printer portion 2 exposes the interior of the printer portion 2, thereby enabling access to the process cartridge 101 and jam processing of the recording material P by the operator. In the present embodiment, the rotary center of the door 6 is selected to be in common with that of the scanner portion 3, but the present invention is not limited to such an embodiment and the door 6 may have the rotary center at an arbitrary position as long as the interior of the printer portion 2 can be sufficiently opened.

The scanner portion 3 is a known scanner of flat bed type having a photoelectric converting element in an image pickup portion for optically reading an original image. Such scanner portion 3 may be of already known internal structure and function, which will not be explained in detail.

(Open-Closing Mechanism of Scanner and Door)

In the following, a detailed description will be given on the open-closing mechanism of the scanner portion 3 and the door 6, with reference to FIGS. 9 to 12.

In a lower rear part of the scanner portion 3, there is provided a scanner rotation supporting portion 3_a_ constituting a hinge portion, and such scanner rotation supporting portion 3_a_ is mounted, rotatably about a rotary center A, on a scanner rotation supporting portion 7_a_ integrally formed with an upper surface 7_c_ of the frame 7 of the printer portion 2, whereby the scanner portion 3 is made integral with the printer portion 2. Also a front end portion 3A of the scanner portion 3, at a side opposite to the rotary center A, is fixed, in a closed state of the scanner portion 3, by an engagement of a recess 3_b_1 (FIG. 7) of a hook 3_b_ provided under the end portion 3_a_ with a claw 8_a_ of a latch 8 provided as fixing means inside the printer portion 2. In this manner the scanner portion 3 can be fixed in the closed state. In the present embodiment, the hook 3_b_ and the latch 8 are provided in each vicinity of the left and right ends of the image forming apparatus 1.

The latch 8 is constantly biased by a latch spring 9 about a rotation center 8_a_ of the latch, in a direction to engage with the hook 3_b_ (toward the front of the image forming apparatus 1 in the present embodiment). A latch releasing button 10 (FIG. 7) serving as releasing means for unlocking the hook 3_b_ and the latch 8 is so supported as to coaxially link with the latch 8, and a depression of the latch releasing button 10 releases the latch 8 from the engagement with the hook 3_b_.

The printer portion 2 and the scanner portion 3 are linked, as connecting means, by a pair of link members, each constituted of a lower link 4 as a first link member and an upper link 5 as a second link member, provided in each vicinity of the left and right front ends of the image forming apparatus 1. In the present embodiment, the lower link 4 and the upper link 5 move (rotate) along a plane substantially parallel to a front-rear direction of the image forming apparatus 1 (substantially parallel to the plane of FIGS. 8 to 12). In the present embodiment, the link members 4, 5 provided at left and right of the image forming apparatus 1 have a substantially same configuration and serve a same function. The link members constituting the connecting means need not necessarily be provided on left and right sides of the image forming apparatus 1 but may be provided on either side thereof. Also the connecting means may typically have a configuration including at least two link members serially connecting the printer portion 2 and the scanner portion 3, but is not limited to the configuration of the present embodiment in which each set is constituted of two link members. The connecting means may be constituted of a larger number of link members as a set.

The lower link 4 is mounted on the printer portion 2, by a configuration that a lower link rotation supporting portion 4*a* is rotatably supported by a lower link rotation supporting portion 7*a* provided on an upper surface 7*c* of the frame 7 of the printer portion 2. The upper link 5 is mounted on the scanner portion 3 by a configuration in which an upper link rotation supporting portion 5*a* is rotatably supported by an upper link rotation supporting portion 3*c* provided in a lower part of the scanner portion 3. The lower link 4 and the upper link 5 are rotatably connected by a lower link connecting portion 4*b*, provided at an end opposite to the lower link rotation supporting portion 4*a*, and an upper link connecting portion 5*b*, provided at an end opposite to the upper link rotation supporting portion 5*a*. The lower face of the scanner portion 3, the frame member 7 of the printer portion 2, the lower link 4 and the upper link 5 are rotatably supported at the respective rotation supporting portions to constitute a 4-articulation link mechanism.

The lower link 4 is provided, at a front end opposite to the lower link rotation supporting portion 4*a*, with a link projection 4*c* extending to the door 6 toward the interior of the printer portion 2 and serving as support means for supporting the door 6. On the other hand, on a lateral face of the door 6, a guide groove 6*a* is provided as receiving means in which the ink projection 4*c* can be substantially fitted and slide. The link projection 4*c* reciprocates in the guide groove 6*a* along the rotary motion of the lower link 4. Then door 6 rotates in an opening direction when the link projection 4*c* presses up the upper surface 6*a*1 of the guide groove 6*a* and the door 6 rotates in a closing direction when the link projection 4*c* presses down the lower surface 6*a*2.

Between the upper surface 7*c* of the frame member 7 of the printer portion 2 and the bottom surface 3*f* of the scanner portion 3, there is provided a pop-up spring 15 constituting an elastic urging means, and the scanner portion 3 is provided with a spring projection 3*c* for securely pressing the pop-up spring 16. As will be explained later in more detail, when the hook 3*b* of the scanner portion 3 and the latch 8 of the printer portion 2 are unlocked, the spring projection 3*e* is pressed by the pop-up spring 16, thereby maintaining the scanner portion 3 in a state rotated by a predetermined angle about the rotary center A. Then the scanner portion 3 can be rotated about the rotary center A by further lifting the front part of the scanner portion 3.

The printer portion 2 is provided with a release object, which is shifted between a first state corresponding to an operation enabled state of the printer portion 2 and the scanner portion 3, and a second state corresponding to an operation disabled state. In the present embodiment, there is provided, as a release object, an interlocking switch 11 for turning on/off controllers of the printer portion 2 and the scanner portion 3, and such interlocking switch 11 is connected to a controller for the printer portion 2 and the scanner portion 3, provided in the printer portion in the present embodiment. The functions of the printer portion 2 and the scanner portion 3 are turned on and off by turning on/off the interlocking switch 11. The door 6 is provided with an interlocking switch projection 6*c*, for depressing a switch lever 11*a* of the interlocking switch 11 for switching thereof. In a closed state of the door 6, the interlocking switch projection 6*c* depresses the switch lever 11*a* thereby turning on the interlocking switch 11 and activating the printer portion 2 and the scanner portion 3. In a state where the door 6 is opened by a certain angle or larger, the interlocking switch projection 6*c* is left from the switch lever 11*a* thereby turning off the interlocking switch 11 and deactivating the printer portion 2 and the scanner portion 3.

In the present embodiment, there is also provided, as a release object, with a laser shutter open/closing mechanism 12 constituting interception means for turning on/off the laser scanner unit, and a laser shutter switch 12*a* of the laser shutter open/closing mechanism 12 is moved vertically to turn on/off the laser beam irradiation from the polygon mirror 104 of the laser scanner unit 103. The door 6 is provided, as switching means for the interception means, with a laser switch projection 6*d* for depressing the laser shutter switch 12*a*, and, in a state where the door 6 is closed, the laser switch projection 6*d* depresses the laser shutter switch 12*a* to turn on the laser shutter open/closing mechanism 12, thereby enabling irradiation of the laser beam and allowing to form an electrostatic latent image on the photosensitive drum 101*a* in the process cartridge 101 mounted in the printer portion 2. In a state where the door 6 is opened by a certain angle or larger, the laser switch projection 6*d* is released from the laser shutter switch 12*a* to turn off the laser shutter open/closing mechanism 12, thereby disabling irradiation of the laser beam.

Also the printer portion 2 is provided, as a release object, with a pressure releasing lever 14 constituting fixing pressure releasing means, and such pressure releasing lever rotates about an arbitrary rotary axis (in the vicinity of the fixing portion 110 in the present embodiment) whereby a pressure releasing lever 14*a* presses open a metal plate for regulating the pressure of the fixing portion, thereby releasing the pressure applied to the recording material P by the fixing film 110*a* and the pressure roller 110*b* in the fixing portion 110. The pressure releasing lever 14 is provided with a pressure releasing lever groove 14*b* formed by an elongated round hole and engaging with a pressure releasing lever projection 6*e*, constituting means for switching a fixing pressure releasing mechanism, provided on the lateral face of the door 6, so that, by an open-closing operation of the door 6, the pressure releasing lever 14 rotates in a same direction. Consequently, in a state where the door 6 is closed, the pressure releasing lever 14 is also closed to apply a pressure in the fixing portion 110. In a state where the door 6 is opened by a certain angle or larger, the pressure releasing lever 14 is also opened to release the pressure in the fixing portion 110.

The printer portion 2 is further provided, as a release object, with drive transmission releasing means for connect/releasing a drive transmission path to the process cartridge 101. In the present embodiment, also referring to FIG. 12, the driving force to the process cartridge 101 is transmitted through a cartridge-side coupling provided at a longitudinal end (an end in the rear part in FIG. 8 or in the front part of FIG. 12) of the photosensitive drum 101*a* to be driven. The printer portion 2 is provided with a coupling gear as transmission means for transmitting the driving power from a driving motor, provided as drive means in the printer portion 2, to the aforementioned cartridge-side coupling of the process cartridge 101 provided in a normal image forming position. The printer portion 2 is also provided with a coupling releasing lever 15, of which a lower end portion 15*a* is connected with a coupling cam 17. The coupling cam 17, by a rotation, displaces the coupling gear so as to connect/release the cartridge-side coupling and the coupling gear. The coupling releasing lever 15 and the coupling cam 17 constitute drive transmission releasing means. The coupling releasing lever is provided, at an upper end thereof, with a coupling releasing lever projection 15*b*, which is loosely fitted in a coupling releasing groove 6*f* provided as coupling switching means in the door 6 thereby sliding in the coupling releasing groove 6*f*. Thus, by an open-closing operation of the door 6, the coupling releasing lever 15 executes a vertical movement thereby rotating the coupling cam 17.

When the door 6 is opened, a lower end 6*f*1 of the coupling releasing groove 6*f* pulls up the upper end 15*b* (coupling releasing lever projection) of the coupling lever, whereby the lower end 15*a* of the coupling lever pulls in the coupling cam 17. As a result, the coupling cam rotates clockwise in FIG. 12, and the coupling gear provided in the printer portion 2 is retracted to release the transmission of the driving power to the cartridge-side coupling of the process cartridge 101.

When the door 6 is closed, an upper end 6*f*2 of the coupling releasing groove 6*f* presses down the upper end 15*b* (coupling releasing lever projection) of the coupling lever, whereby the lower end 15*a* of the coupling lever presses in the coupling cam 17. As a result, the coupling cam rotates counterclockwise in FIG. 12, whereby the coupling gear of the printer portion 2 meshes with the cartridge-side coupling of the process cartridge 101, thereby enabling driving power transmission.

(Open-Closing Operation of Scanner Portion and Door)

In the following, open-closing operation of the scanner portion 3 and the door 6 will be explained.

Figure 9:
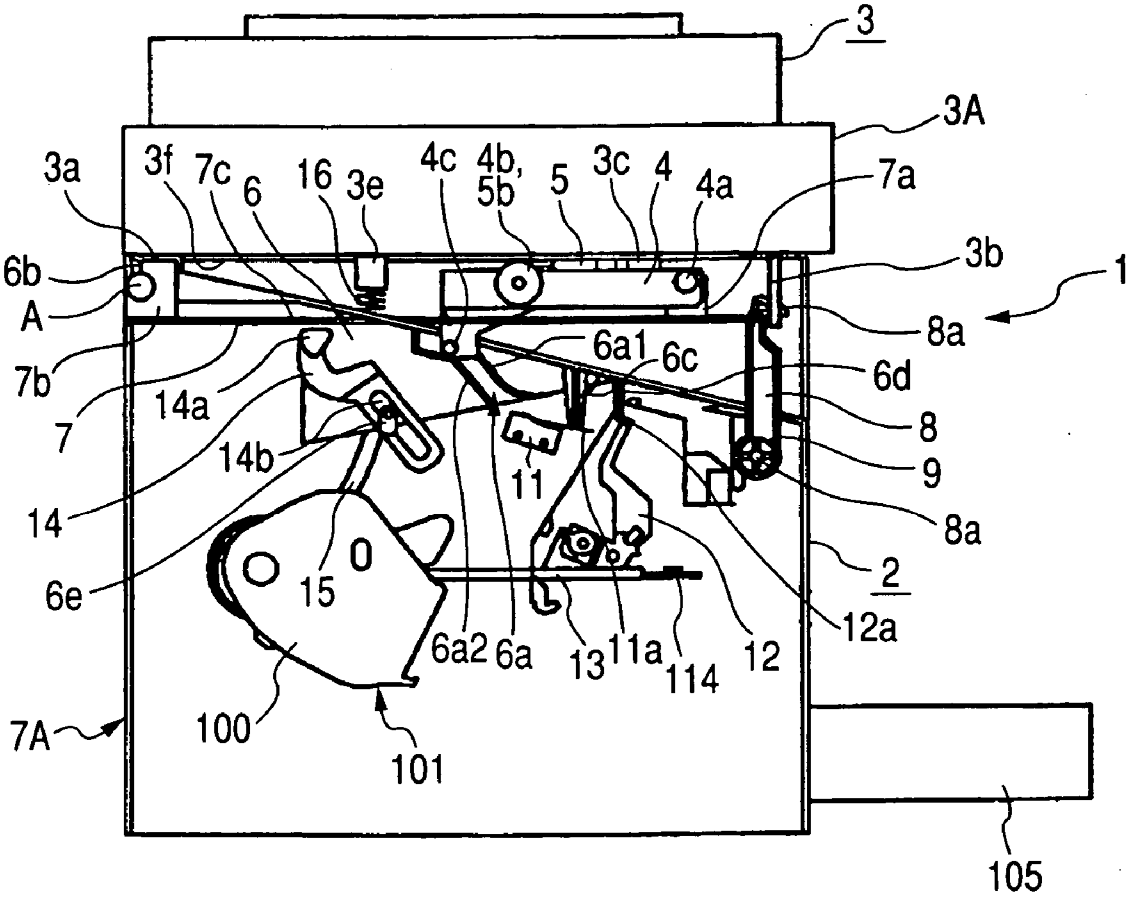
FIG. 9 is a cross-sectional view showing a state where the scanner is closed.

In a stationary operation, namely in a printing operation or an original scanning operation in a state where the process cartridge 101 is mounted in the printer portion 2, the scanner portion 3 is fixed to the printer portion 2 by the scanner rotation supporting portion 3*a* and by a locking portion where the hook 3*b* provided at the front part 3A of the scanner portion 3 opposite to the rotary center A engages with the latch 8 of the printer portion 2 (first position) (FIG. 9).

In case of opening the interior of the printer portion 2 for the replacement of the process cartridge 101 or for processing a jam, the latch releasing button 10 is depressed to cause the linked latch 5 to rotate counterclockwise, whereby the hook 3*b* is released from the latch 8. Thus, the spring projection 3*e* is depressed by the pop-up spring 16 provided between the upper face 7*c* of the frame member 7 of the printer portion 2 and the spring projection 3*e* of the bottom face 3*f* of the scanner portion 3 whereby the scanner portion 3 rotates counterclockwise in FIG. 9 to a predetermined angle $\alpha 1$ to the printer portion 2 and maintained in such state (FIG. 10).

Therefore, the operator can easily recognize that the hook 3*b* and the latch 8 are unlocked.

Figure 10:
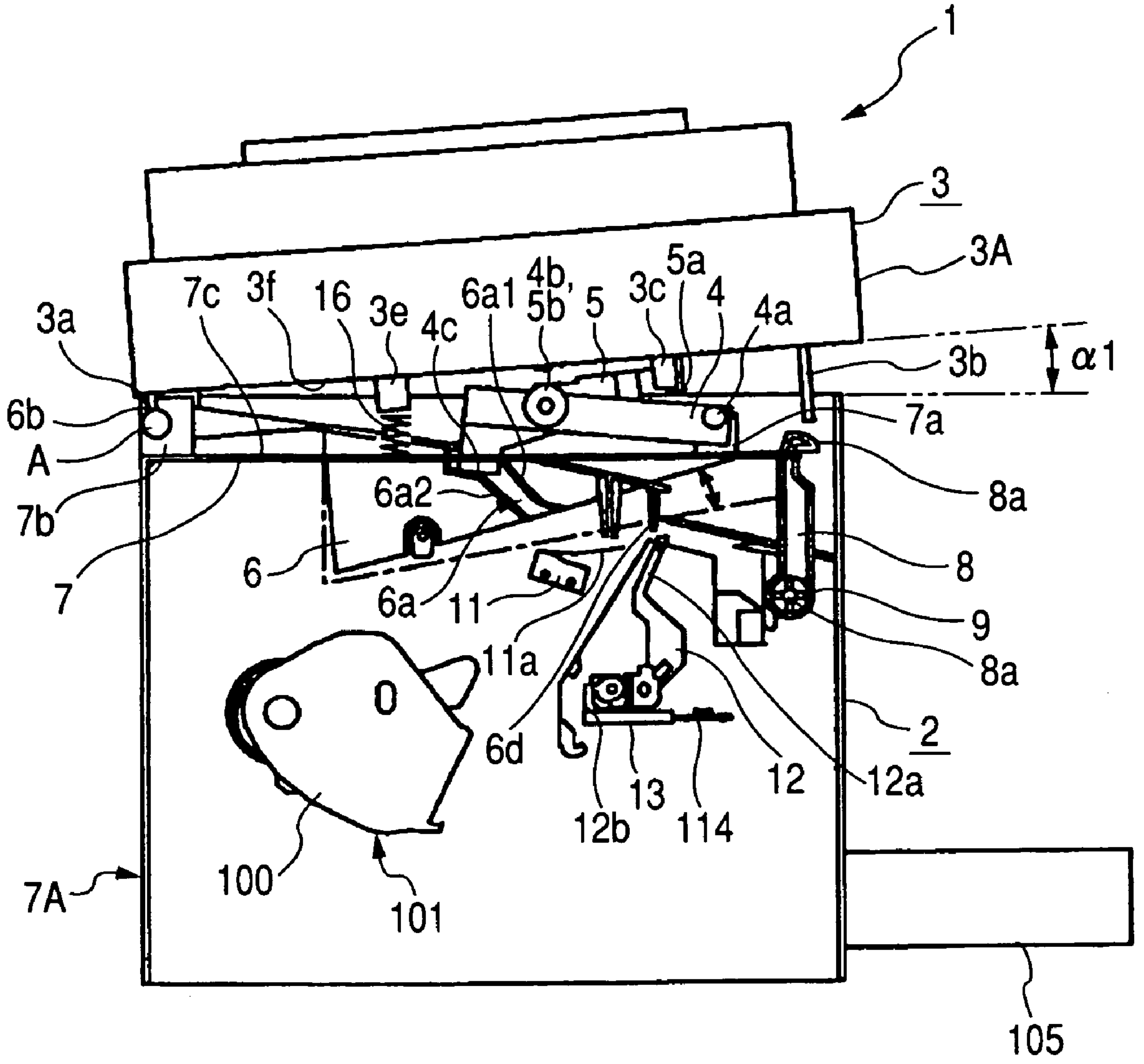
FIG. 10 is a cross-sectional view showing a state, in an open-closing operation of the scanner and the door, where the scanner is popped up after unlocking.

In this state, as the scanner portion 3, the frame member 7 of the printer portion 2, the lower link 4 and the upper link 5 constitute a 4-articulation link, with the rotating motion of the scanner portion 3, the lower link 4 rotates clockwise in FIGS. 9 and 10 about the lower link rotation supporting portion 4*a*, while the upper link 5 rotates counterclockwise in FIGS. 9 and 10 about the upper link connecting portion 5*b*, respectively along predetermined trajectories.

With the rotation of the lower link 4, the link projection 4*c* provided on the lower link 4 also rotates along a predetermined trajectory, thereby pushing up the upper face 6*a*1 of the fitted guide groove 6*a*.

By such upward pushing of the guide groove 6*a*, the door 6 is pressed upwards and rotates counterclockwise in FIG. 10, about a rotation supporting portion 6*b* of the door 6, mounted rotatably in the rotation supporting portion of the frame member 7 of the printer portion 2 about the rotary center A common with that of the scanner portion 3.

Also when the scanner portion 3 and the door 6 through the link members 4, 5 are opened to predetermined angles in response to the depression of the latch releasing button 10, the interlocking switch projection 6*c*, the laser switch projection 6*d*, the pressure releasing lever 6*e* and the coupling releasing groove 6*f* associated with the door 6 are pushed up together. Thus, in a state where the door 6 is opened to a predetermined angle $\alpha 1$, the interlocking switch projection 6*c* is released from the interlocking switch lever 11*a*, while the laser switch projection 6*d* is released from the shutter switch 12*a*, also the pressure releasing lever 6*e* releases the fixing pressure of the fixing portion 110, and the coupling releasing groove 6*f* pulls the coupling releasing lever 15 upwards.

As a result, the interlocking switch 11 is in a released state, and the functions of the printer portion 2 and the scanner portion 3 are stopped, so that the operator can safely access the interior of the printer portion 2. Also the laser beam, being intercepted, does not enter the eyes of the operator. Also in case the recording material P is under passing, it can be extracted with a weak force, since the fixing pressure is released. Also the process cartridge 101 can be taken out easily, as the coupling for transmitting the driving force thereto is also released.

By further lifting manually the front end part 3A of the scanner portion 3 from a state where the scanner portion 3 is opened by the predetermined angle $\alpha 1$ relative to the printer portion 2, the scanner portion 3 and the door 6 are further pushed upwards. Then, by pushing the scanner portion 3 to a predetermined angle $\alpha 2$ to the printer portion 2, the lower link 4 and the upper link 5 are maintained within an extent manually releasable in closing the scanner portion 3, thus supporting the scanner portion 3 in an open state. In this state, the link projection 6*e* supports the guide groove 6*a*, and the door 6 is maintained in an open state. Thus the operator is rendered accessible to the interior of the printer portion 2 (second position) (FIG. 11).

Figure 11:
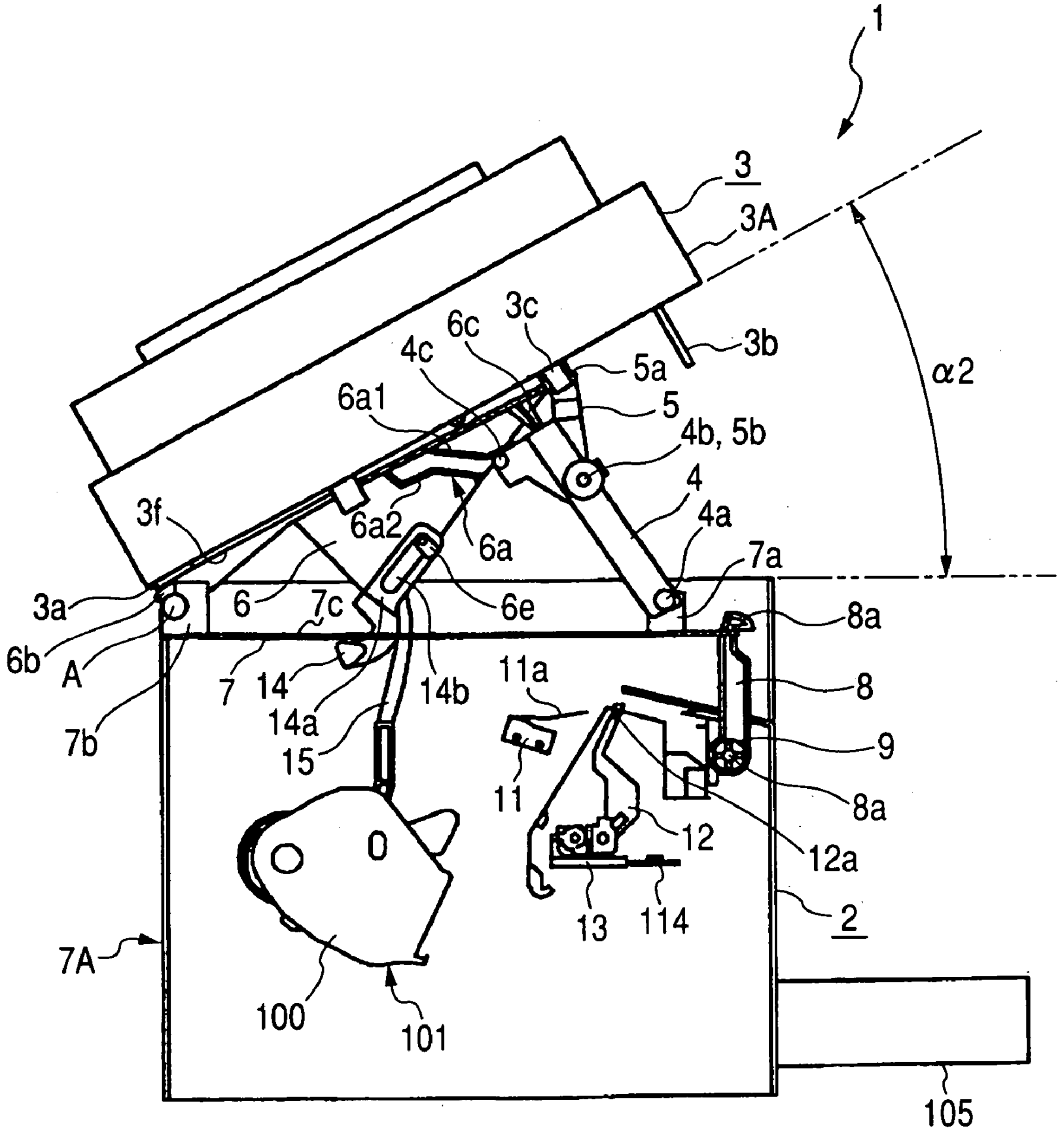
FIG. 11 is a cross-sectional view showing a state, in an open-closing operation of the scanner and the door, where the scanner is opened.
Figure 12:
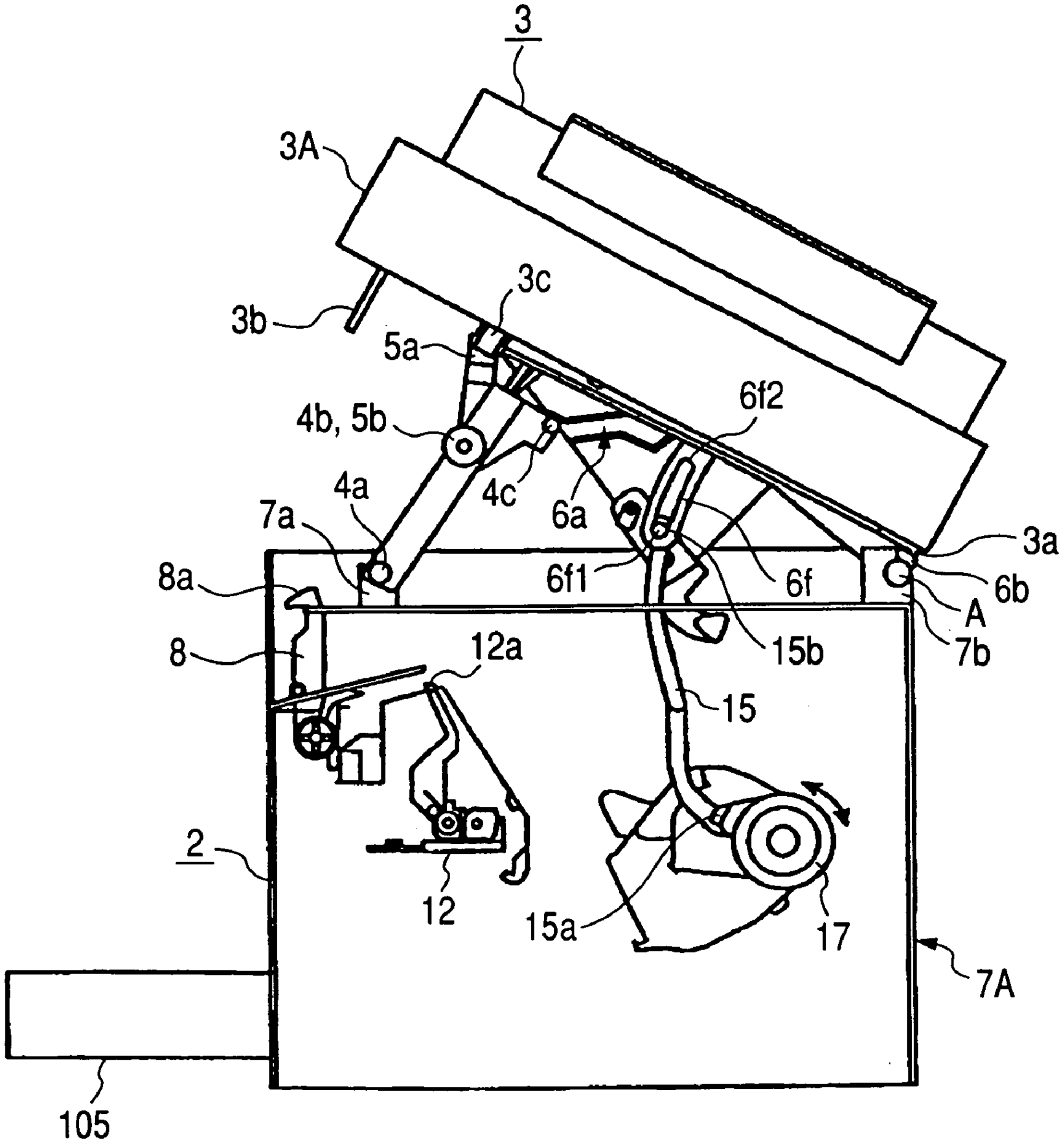
FIG. 12 is a cross-sectional view showing a state, in an open-closing operation of the scanner and the door, where the scanner is opened.

On the other hand, in closing the scanner portion 3, the front part 3A of the scanner portion 3 opposite to the rotary center A is pressed down whereby the scanner portion 3 rotates clockwise in FIGS. 9 to 11. As the lower surface of the scanner portion 3, the frame member 7 of the printer portion 2, the lower link 4 and the upper link 5 constitute a 4-articulation link, with the rotating motion of the scanner portion 3, the lower link 4 rotates clockwise in FIGS. 9 to 11 about the lower link rotation supporting portion 4*a*, while the upper link 5 rotates counterclockwise therein about the upper link connecting portion 5*b*, respectively along predetermined trajectories.

With the rotation of the lower link 4, the link projection 4*c* provided on the lower link 4 also rotates along a predetermined trajectory, thereby pushing down the lower face 6*a*2 of the fitted guide groove 6*a*, whereby the door 6 is pressed down and rotates clockwise about the door rotation supporting portion 6*b*.

When the door reaches a normal closed state, the interlocking switch projection 6*c*, the laser switch projection 6*d*, the pressure releasing lever 6*e* and the coupling releasing groove 6*f* associated with the door 6 are pushed downward together. Thus, the interlocking switch 11 is turned on, the laser beam irradiation is made possible by the laser shutter open/closing mechanism, the fixing pressure is secured by the pressure releasing lever 14, and the transmission of the driving force to the process cartridge 101 is turned on by the coupling releasing mechanism, whereby the ordinary printing operation is enabled.

Also the latch 8 is constantly biased clockwise in FIGS. 9 to 11 by the latch spring 9, but, immediately before complete closing of the scanner 3, it is momentarily rotated counterclockwise against the urging force of the latch spring 8*a*, by the entry of the hook 3*b* from above, and is thereafter rotated clockwise again by the latch spring 8*a*. Thus the recess 3*b*1 of the hook 3*b* engages with the claw 8*a* of the latch 8 to fix the end part 3A of the scanner 3 opposite to the rotary center A.

According to the present invention, in the image forming apparatus 1 having the scanner portion 3 above the printer portion 2 across the recording material discharge portion, the scanner portion 3 and the cover 6 constituting a part of the printer portion 2 are constructed rotatable to enable open-closing of the cover 6 together with the open-closing operation of the scanner portion 3, thereby minimizing the footprint and the height of the image forming apparatus and significantly improving the operability.

Also the open-closing operation of the scanner portion 3 allows to simultaneously achieve, through the function of the door 6, an on/off operation of the interlocking switch 11, an interception of the laser scanner unit 13, an on/off operation of the fixing pressure and an on/off operation of the driving power transmission to the process cartridge. 101.

Thus, by positioning the scanner portion 3 above the printer portion 2 across the recording material discharge portion 113, it is rendered possible to reduce the footprint and height of the apparatus as far as possible, while securing a sufficient space for opening the interior of the printer portion 2, and to achieve safe and easy access to the interior of the printer portion 2 by a single opening operation of the scanner portion 3 thereby enabling safe and easy operations of trouble processing, cleaning, replacement of internal consumable parts etc. in the interior of the printer portion 2.

Also in the present embodiment, substantially simultaneously with the unlocking of the hook 3*b* and the latch 8 by the depression of the latch releasing button 10 (namely until the scanner portion 3 reaches the pop-up state), the printer portion 2 and the scanner unit 3 reaches a stopped state (turning-off of the interlocking switch, interception of the laser scanner unit, and release of the driving power transmission to the process cartridge 101) through the link members 4, 5 and the door 6. In this manner, it is possible to prevent the functions of the printer portion 2 and the scanner portion 3 in such unlocked state.

However the present invention is not limited to such embodiment, and the printer portion 2 and the scanner portion 3 may be brought to the stopped state in a period while the scanner portion 3 and the door 6 are opened further from the pop-up state of the scanner portion 3 to a state enabling access of the operator to the interior of the printer portion 2. Also the invention is not limited to an embodiment in which the scanner portion 6 and the door 6 start to open simultaneously but the link projection 4*c* and the guide groove 6*a* may be so constructed that the door 6 starts to open when the scanner portion 3 is opened by a predetermined angle.

Figure 14:
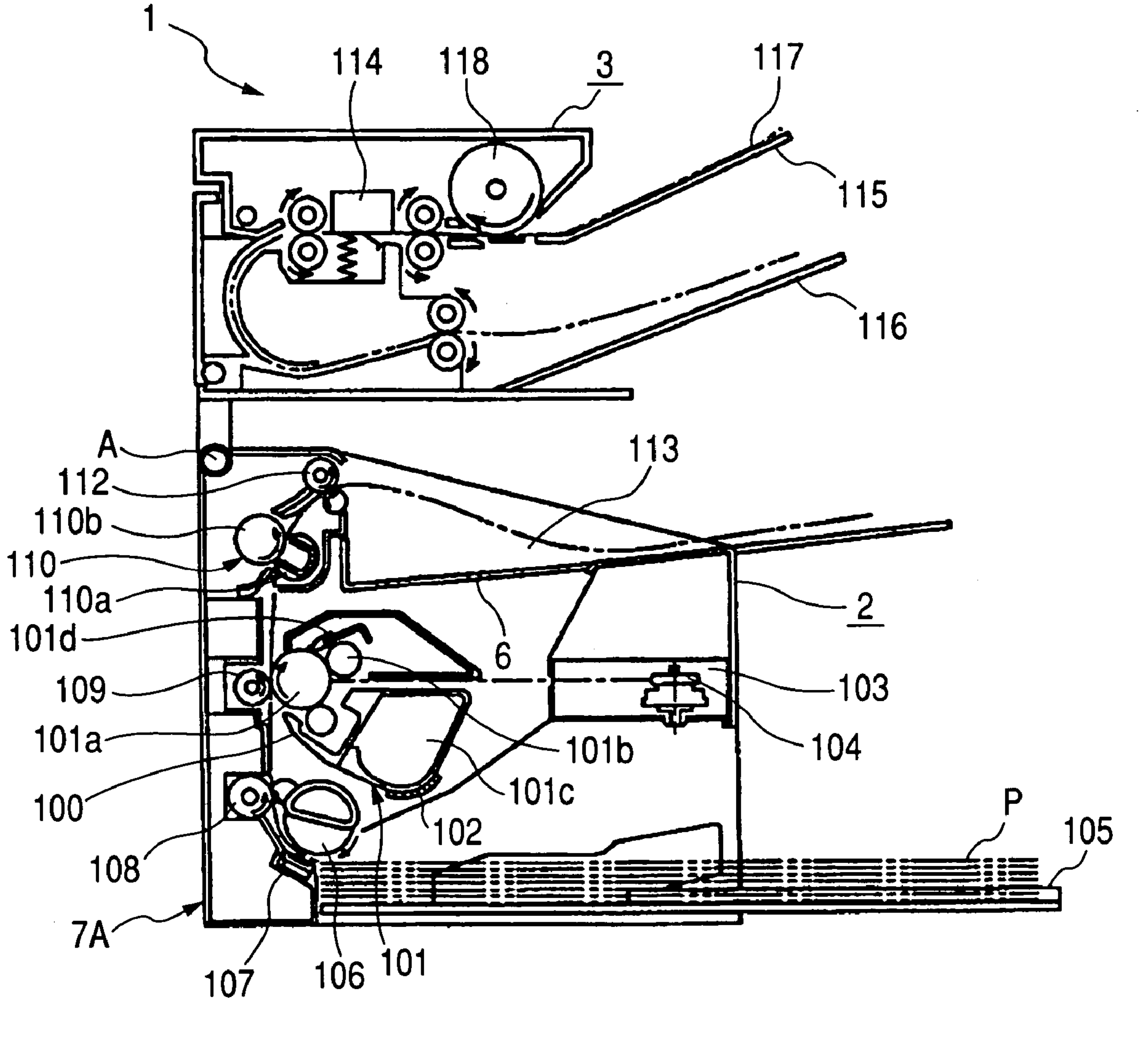
FIG. 14 is a cross-sectional view showing an image forming apparatus constituting a fourth embodiment of the present invention.

In the following, a fourth embodiment of the present invention will be explained. FIG. 14 is a schematic cross-sectional view of the image forming apparatus of the present embodiment. The functions are similar to those in the embodiment 1 but the scanner portion is different in its configuration. Therefore, components same or equivalent in function or configuration to those in the first embodiment are represented by same numbers and will not be explained further.

The image forming apparatus 1 of the present embodiment is provided, as an image reading portion (scanner portion) 3 and in place for the flat bed scanner in the first embodiment, with a scanner of automatic original feeding type having a contact image sensor 114 for optically reading an original image as an image pickup portion. The scanner portion 3 is provided with an original stacking tray 115 and an original discharge tray 116, respectively at the upstream and downstream sides of the contact image sensor 114.

Originals (sheet materials) 117 are set on the original stacking tray 115 with image-bearing surfaces upwards, and are conveyed one by one from an uppermost one by a pickup roller 118 to an original reading portion. The conveyed original 117 is subjected, by the contact image sensor 114, to a photoelectric reading of the image on the original, and the original 117 after image reading is discharged onto the original discharge tray 116 in the original reading apparatus, with the image-bearing surface downwards.

Between the scanner portion 3 and the printer portion 2, a lower link and an upper link are provided in a 4-articulation structure as in the first embodiment. The linkage of the open-closing operation of the scanner portion 3 and the door 6, the operation of the interlocking switch, the interception of the laser beam, the decoupling of the process cartridge and the releasing of the fixing pressure can be similar to those in the foregoing first embodiment and will not be explained in repetition.

Also as in the present embodiment in which the image forming apparatus 1 is provided with the scanner portion 3 of automatic original feeding type and is made somewhat larger in the scanner portion 3, the present invention allows to provide the recording material discharge portion 113 above the printer portion 2 thereby reducing the height of the apparatus as far as possible and to open the interior of the printer portion 2 by a simple operation as in the first embodiment thereby enabling processing trouble, an cleaning or replacement of a consumable (replacement) component such as a cartridge in the interior of the printer portion 2 in safe and easy manner.

In the foregoing embodiments, the consumable (replacement) component that is rendered replaceable by opening the door 6 of the printer portion 2 is assumed as a process cartridge, but the present invention is not limited to such embodiments. The invention is likewise applicable to a case where the developing device is singly constructed as a cartridge (development cartridge) mountable to or detachable from the main body of the image forming apparatus, or a developer container is singly constructed as a cartridge mountable to or detachable from the main body of the image forming apparatus.

According to the embodiments explained in the foregoing, in an image forming apparatus including an image forming portion and an image reading portion, a recording material discharge portion is provided between the image forming portion and the image reading portion provided thereabove to achieve an effective space utilization thereby reducing the footprint or the height of the apparatus, also to open the interior of the image forming portion by a simple configuration and a simple operation, and to enable switching operations for stopping devices provided in the apparatus by a simple operation, thereby enabling processing trouble, an cleaning or replacement of a consumable (replaceable) component such as a cartridge in the interior of the printer portion in safe and easy manner.

The present invention has been explained by embodiments thereof, but the present invention is not limited thereto and is subject to any and all modifications within the spirit and scope of the appended claims.

What is claimed is:

1. An image forming apparatus comprising:

an image forming portion for forming an image;

an openable and closable member for being opened and closed with respect to a main body of said image forming portion;

an image reading portion for reading an image, wherein said image reading portion ia provided above said image forming portion, and said openable and closable member is positioned at an upper side of said image forming portion; and a recording material discharge portion to which a recording material is discharged, provided between said image reading portion and said image forming portion, wherein the recording material on which an image is formed in said image forming portion is discharged to said recording material discharge portion, and the recording material discharged to said recording material discharge portion is stacked on said openable and closable member, wherein said image reading portion is movable with respect to said image forming portion, and wherein said openable and closable member is movable toward said image reading portion, and said openable and closable member moves in relation to a movement of said image reading portion.

2. An image forming apparatus according to claim 1, wherein said openable and closable member is an external cover.

3. An image forming apparatus according to claim 1, further comprising image forming means detachably mountable to the main body of said image forming portion, wherein said image forming means is mountable or detachable by opening said openable and closable member.

4. An image forming apparatus according to claim 3, further comprising a process cartridge containing said image forming means, wherein said process cartridge is mountable or detachable by opening said openable and closable member.

5. An image forming apparatus according to claim 1, further comprising link means for moving said openable and closabel member in relation to the movement of said image reading portion.

6. An image forming apparatus according to claim 5, wherein said link means includes a first link member movably connected to said image forming portion and second link member movably connected to said image reading portion, and wherein said first link member and said second link member are movably connected.

7. An image forming apparatus according to claim 5, wherein said image reading portion comprises a protruding portion to press said link means, and wherein the protruding portion of said image reading portion presses said openable and closable member through said link means when said image reading portion moves toward a side of said image forming portion.

8. An image forming apparatus according to claim 1, wherein an opening angle of said openable and closable member ia lorger than an opening angle of said image reading portion.

9. An image forming apparatus according to claim 1, wherein said image reading portion and said openable and closable member are capable of rotational movement.

10. An image forming apparatus according to claim 9, wherein said image reading portion and said openable and closable member have a same rotary center.

11. An image forming apparatus according to claim 1, further comprising switching means for switching between a first state which is an operation enable state and a second state which is an operation disabled state, wherein said switching means switches the first state and the second state in response to the movement of said openable and closable member.

12. An image forming apparatus according to claim 11, wherein said switching means switches a control portion for said image forming portion and said image reading portion to an operation state or a stopped state.

13. An image forming apparatus according to claim 11, further comprising light emitting means for emitting a light and intercepting means for being able to intercept the light emitted from said light emitting means, wherein said switching means switches said intercepting means to a state of not intercepting the light or to a state of intercepting the light.

14. An image forming apparatus according to claim 11, further comprising fixing means for applying a pressure to a recording material, wherein said fixing means has a first pressure state and a second pressure state in which a pressure is smaller than said first pressure, and wherein said switching means switches said fixing means to the first pressure state or to the second pressure state.

15. An image forming apparatus according to claim 11, further comprising:

an image bearing member; and drive transmitting means for transmitting a driving power to said image bearing member, wherein said switching means switches said drive transmitting means to a state of transmitting the driving power or to a state of not transmitting the driving power.

* * * * *

UNITED STATES PATENT AND TRADEMARK OFFICE

CERTIFICATE OF CORRECTION

PATENT NO. : 7,133,626 B2
APPLICATION NO. : 10/902790
DATED : November 7, 2006
INVENTOR(S) : Miho Kaiga et al.

It is certified that error appears in the above-identified patent and that said Letters Patent is hereby corrected as shown below:

COLUMN 2:
Line 35, “to” should be deleted.

COLUMN 15:
Line 66, “embodiment 1” should read --first embodiments--.

COLUMN 16:
Line 39, “an” should read --a--.
Line 65, “an” should read --a--.

COLUMN 17:
Line 47, “closabel” should read --closable--.

Signed and Sealed this

Fourteenth Day of August, 2007

JON W. DUDAS
*Director of the United States Patent and Trademark Office*